(12) United States Patent
Landrum et al.

(10) Patent No.: US 7,670,090 B1
(45) Date of Patent: Mar. 2, 2010

(54) WIND TURBINE BLADE TRANSPORTATION SYSTEM AND METHOD

(75) Inventors: Scott C. Landrum, Southlake, TX (US); T. Christopher King, Keller, TX (US)

(73) Assignee: Transportation Technology Services, Inc., Southlake, TX (US)

( * ) Notice: Subject to any disclaimer, the term of this patent is extended or adjusted under 35 U.S.C. 154(b) by 0 days.

(21) Appl. No.: 12/190,219

(22) Filed: Aug. 12, 2008

(51) Int. Cl.
*B60P 3/022* (2006.01)
*B60P 3/40* (2006.01)
*B60P 3/00* (2006.01)

(52) U.S. Cl. .............................. 410/44; 410/45; 410/53
(58) Field of Classification Search .................. 410/44, 410/45, 32–35, 53, 120, 49, 156; 220/1.5; 105/396, 404, 407, 411, 355, 393
See application file for complete search history.

(56) References Cited

U.S. PATENT DOCUMENTS

| | | | | |
|---|---|---|---|---|
| 3,648,622 | A | * | 3/1972 | Lich ............................ 410/53 |
| 4,150,628 | A | * | 4/1979 | Keldenich ..................... 410/45 |
| 4,844,672 | A | | 7/1989 | Yurgevich |
| 6,422,795 | B2 | | 7/2002 | Holt et al. |
| 6,827,024 | B2 | * | 12/2004 | Kassab et al. ............ 105/157.1 |
| 7,210,882 | B2 | | 5/2007 | Anderson et al. |
| 7,303,365 | B2 | * | 12/2007 | Wobben ....................... 410/45 |
| 2004/0091346 | A1 | | 5/2004 | Wobben |
| 2005/0031431 | A1 | * | 2/2005 | Wobben ....................... 410/45 |
| 2005/0063795 | A1 | * | 3/2005 | Jagos et al. ................... 410/49 |
| 2007/0189895 | A1 | * | 8/2007 | Kootstra et al. ................. 416/9 |

* cited by examiner

*Primary Examiner*—Patricia L Engle
(74) *Attorney, Agent, or Firm*—Dan Brown Law Office; Daniel R. Brown

(57) ABSTRACT

A system for transporting an airfoil having a root end, a tip end, and a midsection over a railroad, utilizing a first railcar coupled to a second rail car. The system includes a bracket fixed to the root end of the airfoil and also connected to the first railcar, where the bracket is oriented to align the tip end of the airfoil toward the second rail car. A sling stand is connected to the second railcar, and a sling is hung from the sling stand and aligned to engage and support the midsection of the airfoil, and thereby accommodates misalignment during transport over the railroad. A pair of rollers are disposed on either side of the airfoil to limit lateral movement thereof.

20 Claims, 8 Drawing Sheets

Fig. 21

WIND TURBINE BLADE TRANSPORTATION SYSTEM AND METHOD

BACKGROUND OF THE INVENTION

1. Field of the Invention

The present invention relates to transporting wind turbine blades. More specifically, the present invention relates to a system and method for transporting long airfoils via railroad using plural railcars.

2. Description of the Related Art

Large-scale wind turbines are used to generate electrical power. Such wind turbines consist of a tall tower with a generator nacelle rotatably coupled about the top of tower's vertical axis. A rotor hub extends out a horizontal axis of the nacelle. Two or more turbine blades are connected to the rotor hub at right angles to the horizontal axis. During operation, prevailing winds cause the turbine blades to rotate about the rotor hub's horizontal axis. The rotational forces are coupled to a generator within the nacelle, which produces electricity. The nacelle rotates about the vertical axis of the tower to maintain the wind turbine blades in proper orientation with the direction of the prevailing winds.

The various components of a large-scale wind turbine may be manufactured at different geographic locations, which may be anywhere in the world. For example, a manufacturer who wishes to assemble a wind turbine generator tower in the United States may have the towers manufactured in Korea, the nacelles manufactured in Denmark and the blades manufactured in Germany. These components must then be then transported to the ultimate power generation site, assembled, erected, and placed into operation. Since the manufacturing operations may be spread across the world, transportation of the components to the generation site may utilize all modes of transportation, including ships, barges, trains and trucks. The various components are expensive to manufacture, and include delicate components that must be protected and handled properly during transportation. The transportation issues are exacerbated in that the components may be transported using plural modes during their journey. For example, a wind turbine blade manufactured in Europe may travel by ship across the ocean, then via railroad to a location in the geographic area of the generation site, and then finally by truck to the ultimate destination.

The evolution of technology and the economies of scale have lead to the development and deployment of large-scale wind turbines with larger and larger proportions. The power generation capacity of a large-scale wind turbine is directly related to the length of the turbine blades, which define the swept area and power capacity of the turbine. The wind loading stresses involved during operation, and the need to keep the total mass of the turbine blades reasonably low, has lead engineers to design and build turbine blades as monocoque structures, typically employing composite materials. The lengths of these structures have grown to over 100 feet in length and at present approach 150 feet in length. Transportation of long turbine blades presents significant challenges to transportation engineers, particularly in the case of railroads, where the railroad profile is tightly limited and the trains must traverse curved sections and complex rail yards. Thus it can be appreciated that there is a need in the art for a system and method addressing the problems related to transportation of long wind turbine blades and other long airfoils via rail.

SUMMARY OF THE INVENTION

The need in the art is addressed by the systems and methods of the present invention. The present invention teaches a system for transporting an airfoil having a root end, a tip end, and a midsection over a railroad, utilizing a first railcar coupled to a second rail car. The system includes a bracket fixed to the root end of the airfoil and also connected to the first railcar, where the bracket is oriented to align the tip end of the airfoil toward the second rail car. A sling stand is connected to the second railcar, and a sling is hung from the sling stand and aligned to engage and support the midsection of the airfoil, and thereby accommodates misalignment during transport over the railroad.

In a specific embodiment of the foregoing system, the first railcar and the second railcar are flat cars. In another embodiment, a roller is rotatably supported with respect to the second railcar, and is aligned to engage the airfoil to allow longitudinal movement thereof while limiting lateral movement. The roller may be supported from the sling stand. In a refinement to these embodiments, a second roller is rotatably supported with respect to the second railcar, and is aligned to engage the opposite side of the airfoil from that of the first roller.

In a specific embodiment of the foregoing system, the bracket is removably connected to first railcar. In a refinement to this embodiment, the bracket is removably connected using a twistlock coupler. In another specific embodiment, the bracket is flexibly connected to the first railcar, thereby accommodating movement of the airfoil about a vertical axis during transit over the railroad. In another embodiment, the bracket is bolted to a flange on the root end of the airfoil.

In a specific embodiment of the foregoing system, the sling is an assembly of plural webbing straps. In another embodiment, the sling is removably attached to the sling stand using rings and hooks. In another embodiment, the system further includes a retention strap attached to the sling stand and draped over the top of the airfoil for limiting upward movement thereof. In another embodiment, the midsection of the airfoil is designated as a suitable support section of the airfoil.

In a specific embodiment, the foregoing system is adapted to additionally transport a second airfoil, similar to the first airfoil, by utilizing a third railcar coupled to the opposite end of the second railcar from that coupled to the first railcar. This embodiment further includes a second bracket fixed to the root end of the second airfoil and connected to the third railcar, where the second bracket is oriented to align the tip end of the second airfoil toward the second railcar. A second sling stand is connected to the second railcar, and a second sling is hung from the second sling stand and aligned to engage and support the midsection of the second airfoil, and also to accommodate misalignment during transport over the railroad. In a refinement to this embodiment, the second sling stand and the second sling support the tip of the second airfoil above the tip of the airfoil, thereby preventing interference with the first airfoil tip.

The present invention also teaches a method for transporting an airfoil that has a root end, a tip end, and a midsection over a railroad, utilizing a first railcar and a second railcar. The method includes the steps of connecting a sling stand to the second railcar and hanging a sling from the sling stand, and then coupling the first railcar to the second railcar. Next, fixing a bracket to the root end of the airfoil and connecting the bracket to the first railcar, and orienting the bracket to align the tip end of the airfoil toward the second rail car. Then, supporting the midsection of the airfoil with the sling, and accommodating misalignment during transport over the railroad by flexing the sling.

In a specific embodiment, the foregoing method further includes allowing longitudinal movement of the airfoil, while limiting lateral movement, by positioning a roller adjacent to the midsection of the airfoil. In another embodiment, the method includes removably connecting the bracket to the first railcar. In another embodiment, the method further includes flexibly connecting the bracket to the first railcar, thereby accommodating movement of the airfoil about a vertical axis during transit over the railroad. In another specific embodiment, the foregoing method further includes limiting upward movement of the airfoil by draping a retention strap over the top of the airfoil and connecting the retention strap to the sling stand.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope hereof and additional fields in which the present invention would be of significant utility.

In considering the detailed embodiments of the present invention, it will be observed that the present invention resides primarily in combinations of steps to accomplish various methods or components to form various apparatus and systems. Accordingly, the apparatus and system components and method steps have been represented where appropriate by conventional symbols in the drawings, showing only those specific details that are pertinent to understanding the present invention so as not to obscure the disclosure with details that will be readily apparent to those of ordinary skill in the art having the benefit of the disclosures contained herein.

In this disclosure, relational terms such as first and second, top and bottom, upper and lower, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a" does not, without more constraints, preclude the existence of additional identical elements in the process, method, article, or apparatus that comprises the element.

The teachings herein address the problems associated with transporting large wind turbine blades and other large airfoils via railroad. The illustrative embodiments presented are principally directed to wind turbine blades, however they are applicable to any large airfoil or similarly structured devices. Such airfoils and devices share the characteristic of a rigid root end that is designed with sufficient strength to support the entire airfoil and accommodate the flexing and stresses involved during operation thereof. Such airfoils are typically tapered through a midsection to a tip end. The section modulus of the airfoil gradually decreases from the root end to the tip end. Generally, the strength profile of the airfoil decreases from the root end to the tip end. In considering the need to support such an airfoil during transportation, it will be appreciated that the airfoil will typically lie in a substantially horizontal orientation, and require two or more support locations. During the transportation of an airfoil, the stresses and bending loads a quite different that those encountered during normal operation. The root end of the airfoil will almost certainly have sufficient strength as a support location during transportation, and the tip end will most likely not have sufficient strength as a support location. Along some region between the root end and the tip end, there will exist sufficient strength to support the airfoil during transportation, and this region will be referred to herein as the midsection. The specific location of the midsection will vary from airfoil to airfoil. In some designs, it may be a narrowly specified portion of the airfoil length that the manufacturer has reinforced to bear transportation loads. In other designs, the midsection may be a broader region between the root end and the tip end.

At present, certain large wind turbine blades having a length of approximately 132 feet are in service, and larger blades having a length of approximately 150 feet are now being deployed. It is expected that wind turbine blades having even longer lengths will be deployed in the future. However, the longest standard rail flatcars that are readily available have a deck length of approximately 89 feet, and a coupler-to-coupler length of approximately 94 feet. This dictates that large airfoils must overhang the length of a railroad flatcar during transportation. Prior loading systems have used two support locations at either end of a single railcar, one supporting the root end of the wind turbine blade and another supporting the wind turbine blade along its midsection, with the tip of the blade extending beyond one end of the railcar. The railcar supporting the wind turbine blade is referred to as the "load" car. The problem of interference between the blade overhang and an adjacent railcar has been addressed by coupling an "idler" car, which is an empty flatcar, to the end of the railcar carrying the wind turbine blade. Further, two wind turbine blade carrying cars have been coupled to a single idler car, with the tip ends of both wind turbine blades extending over the idler car. In the case of a pair of 132 foot blades and 94 foot flatcars, interference between the two blade tip ends can be avoided because the total length of two blades is less than the length of three flatcars. This is not true for a pair of 150 foot blades and three 94 foot flatcars. Another critical factor in employing overhang to address length issues becomes apparent as a train rounds a short radius curve. Main line railroads may have curves as tight as 13 degrees, and some switching yards may have even shorter radius curves, perhaps as tights as 22 degrees. When a train carrying an airfoil rounds such a tight curve, the blade tip ends will swing out beyond the width of the railcar and can cross the permissible rail line sectional profile boundary dictated by the railroad, as are known to those skilled in the art. The swing-out effect is highly problematic and greatly limits the railroad routing options available for such loads.

Figure 1:
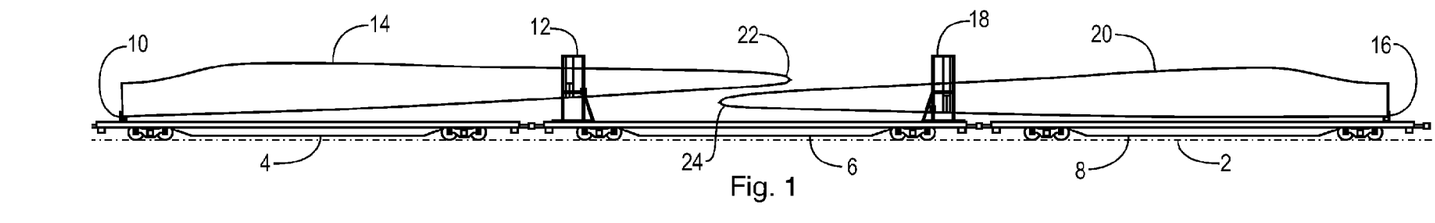
FIG. 1 is an elevation view drawing of a pair of airfoils loaded onto three railcars according to an illustrative embodiment of the present invention.
Figure 2:
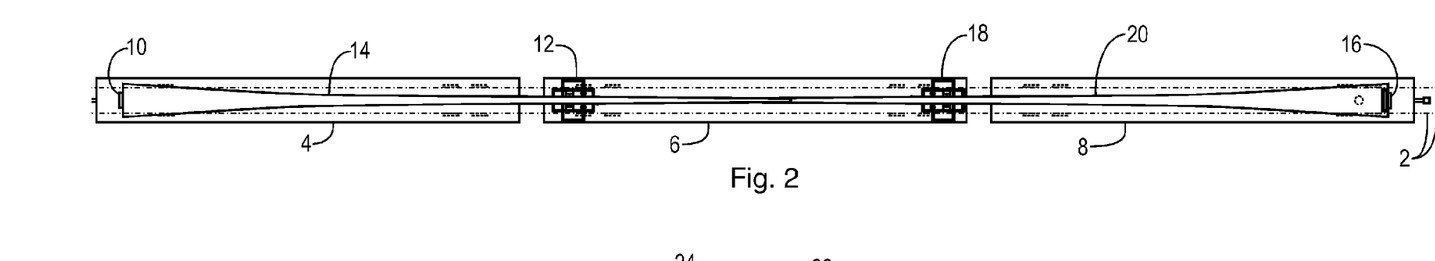
FIG. 2 is a plan view drawing of a pair of airfoils loaded onto three railcars according to an illustrative embodiment of the present invention.

The present invention addresses the problems associated with transporting long airfoils by positioning a midsection support on an idler car, which is then referred to as a "sling" car. The misalignment that naturally occurs as a result of supporting a long object across two coupled railcars is accommodated by employing a flexible sling at one support location and a flexibly connected bracket at the other support location. In addition, guide rollers may be added to limit lateral movement of the airfoil as the train rounds curves in the railroad. Reference is now directed to FIG. 1 and FIG. 2, which are an elevation view drawing and a plan view drawing, respectively, of a pair of airfoils loaded onto three railcars according to an illustrative embodiment of the present invention. The railcars ride along a rail line 2, and are coupled together by conventional means, as are known to those skilled in the art. A first railroad flatcar 4 is fitted with a root end bracket 10 that provides a first support location for a large airfoil 14, which is a 150-foot wind turbine blade in the illustrative embodiment. A second railroad flatcar 6 is fitted with a sling support stand 12 that supports the airfoil 14 at a suitable location along its midsection. The second railroad flatcar 6 is the sling car. The tip end 22 of the first airfoil 14 extends beyond the middle of the sling car's 6 length. A third railroad flatcar 8 is fitted with a second root end bracket 16 that supports a second airfoil 20 at its root end. A second sling stand 18 is connected to the sling car 6 at the opposite end from where the first sling stand 12 is connected. The arrangement of the two sling stands 12,18 is such that the tip end 22 of the first airfoil 14 always remains above the tip end 24 of the second airfoil 20, thereby preventing interference therebetween.

Figure 3:
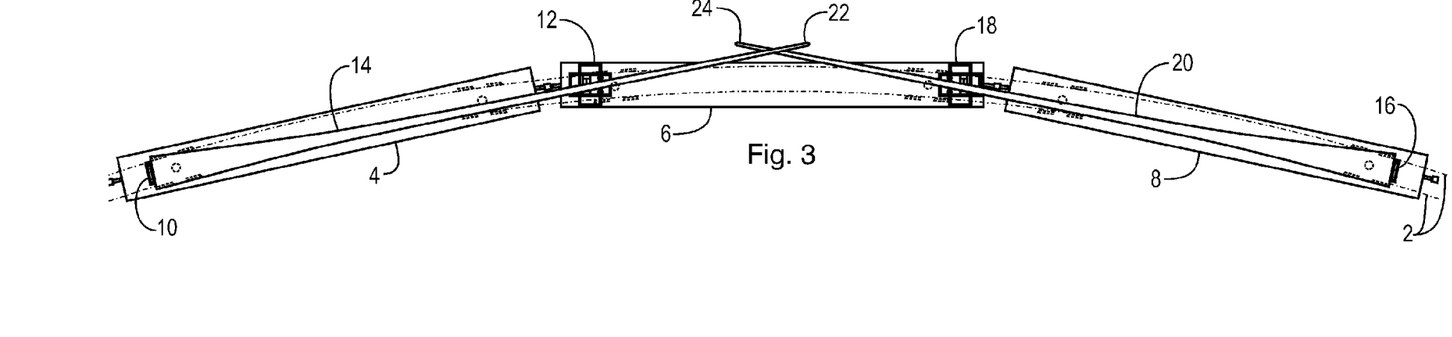
FIG. 3 is a plan view drawing of a pair of airfoils loaded onto three railcars and rounding a curve according to an illustrative embodiment of the present invention.

Reference is directed to FIG. 3, which is a plan view drawing of a pair of airfoils loaded onto three railcars and rounding a curve according to an illustrative embodiment of the present invention. FIG. 3 corresponds to FIG. 1 and FIG. 2. In FIG. 3, the three railcars 4, 6, 8 are rounding a curve in the railroad 2, illustrated as being approximately thirteen degrees of curvature. The first airfoil 14 and second airfoil 20 are retained in alignment with the railcars by the first sling stand 12 and second sling stand 18, respectively. The misalignment between the centerline of the railcars and the centerline of the airfoils is accommodated by flexible slings disposed from the sling stands, which are further detailed hereinafter. A slight rotation of the airfoil root ends is accommodated using flexible connection between the first root support bracket 10 and the second root support bracket 16 that allows rotation about a vertical axis with respect to the corresponding railcars 4 and 8. The extent that the tip ends 22, 24 extend beyond the width of flatcar 6 is reduced by virtue of the location of the sling stands 12,18. Note that the extent of the swing-out is controlled by adjusting the position of the sling stands 12, 18 on the sling car 6. The closer the sling stands are to the center of the sling car, the less the tip end swing-out will be. However, the sling support must lie within the acceptable midsection support region of the particular airfoils that are being transported. The foregoing figures are directed to an embodiment comprising three 89-foot flatcars and two 150-foot airfoils. The invention is not limited thereto. In the future, longer airfoils may exceed the length of two 89-foot flatcars, so an idler car may be added to the train, which would then include a load car, a sling car and an idler car. An idler car could also be disposed between the load car and the sling car. Of course, railcars having a longer or shorter length could be substituted. In the case where two extremely long airfoils are transported, four or five railcars could be coupled as a load car, idler car, sling car, idler car, and load car. Other configurations can also be envisioned. In addition, an articulated spine railcar could also be included as either the load car or the sling car, or both.

Figure 4:
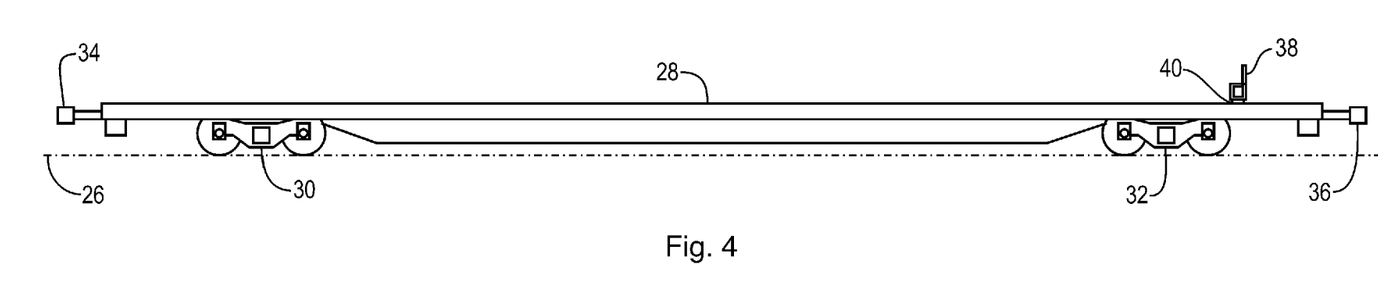
FIG. 4 is an elevation view drawing of a load car according to an illustrative embodiment of the present invention.
Figure 5:
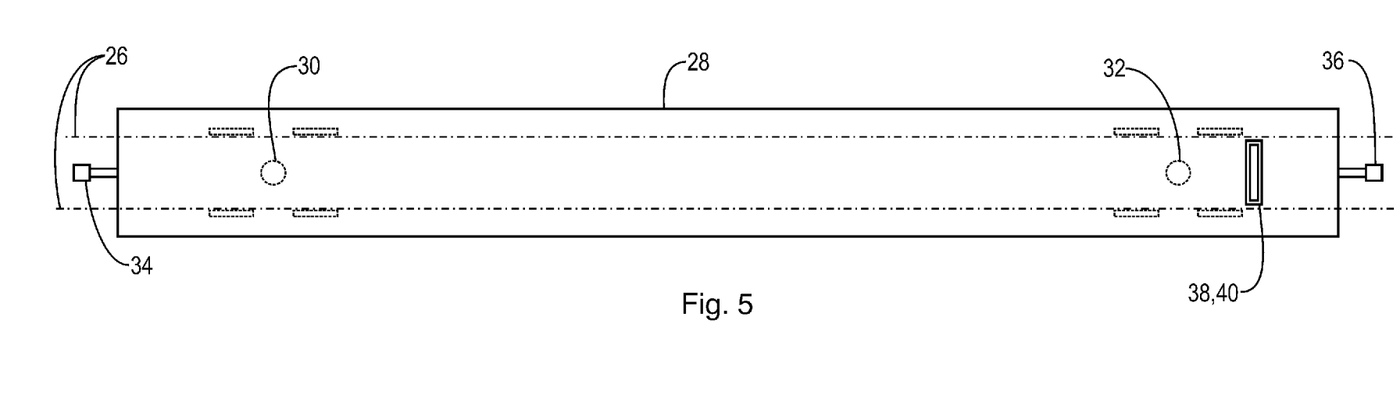
FIG. 5 is a plan view drawing of a load car according to an illustrative embodiment of the present invention.

Reference is directed to FIG. 4 and FIG. 5, which are an elevation view drawing and a plan view drawing, respectively, of a typical load car 28 according to an illustrative embodiment of the present invention. An 89 foot flatcar 28 having a steel deck is used as the basis for a load car in the system of the present invention. The flatcar 28 consists of a pair of trucks 30,32 supporting the deck of the rail car 28 in the conventional fashion, and that roll on a conventional railroad line 26. A pair of railcar couplers 34,36, also of conventional design, bring the overall length of the flatcar 28 to approximately 94 feet. A root support bracket 38 is connected to the deck of the flatcar 28 using a pair of twistlock buffer fixed bases 40, which enable a small degree of flexibility in the connection. Twistlock connections are known to those skilled in the art of intermodal shipping and containers. Further information about twistlock buffers and connections is available form Buffers USA, Inc., of Jacksonville, Fla. While twistlock buffers 40 are used in the illustrative embodiment, those skilled in the art will appreciate that other flexible connection techniques could be utilized to provide the desired degree of flexibility, such as bolts with oversized holes, electrometric connections, slotted engagement means and so forth. Also, in certain embodiments where the system designer can rely upon inherent flexibility in the airfoil being transported, the root support bracket 38 may be rigidly connected to the deck of the railcar 28. The load car 28 may be reversed in direction so as to function as either the leading or trailing car in a coupled three-car series to transport two airfoils, as discussed hereinbefore.

Figure 6:
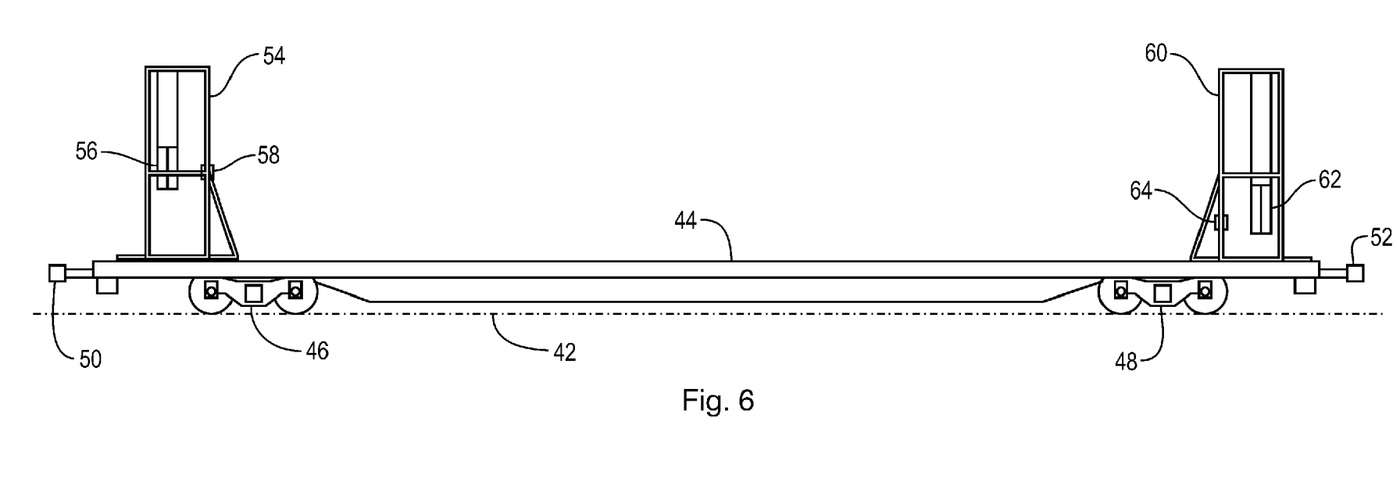
FIG. 6 is an elevation view drawing of a sling car according to an illustrative embodiment of the present invention.
Figure 7:
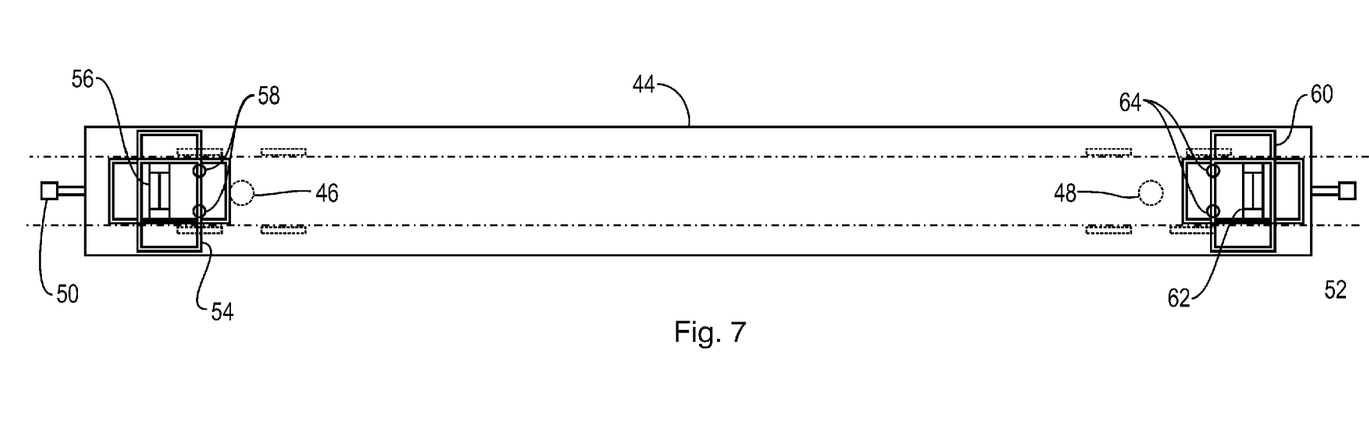
FIG. 7 is a plan view drawing of a sling car according to an illustrative embodiment of the present invention.
Figure 8:
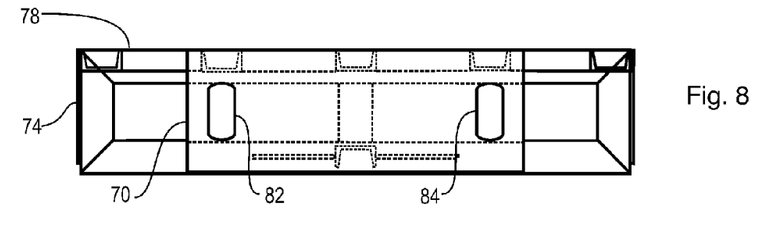
FIG. 8 is a bottom view drawing of a root end support bracket according to an illustrative embodiment of the present invention.
Figure 9:
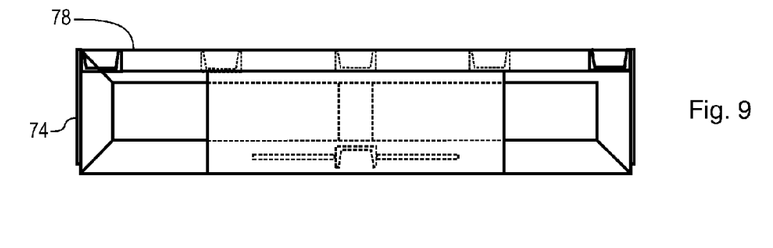
FIG. 9 is a top view drawing of a root end support bracket according to an illustrative embodiment of the present invention.
Figure 10:
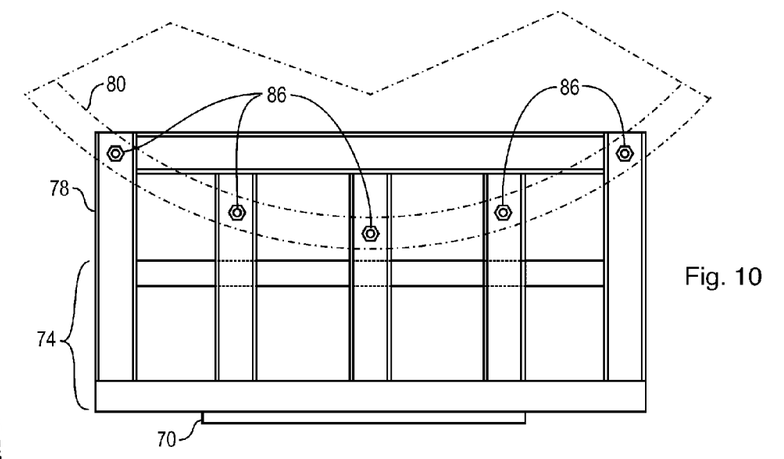
FIG. 10 is an end view drawing of a root end support bracket according to an illustrative embodiment of the present invention.
Figure 11:
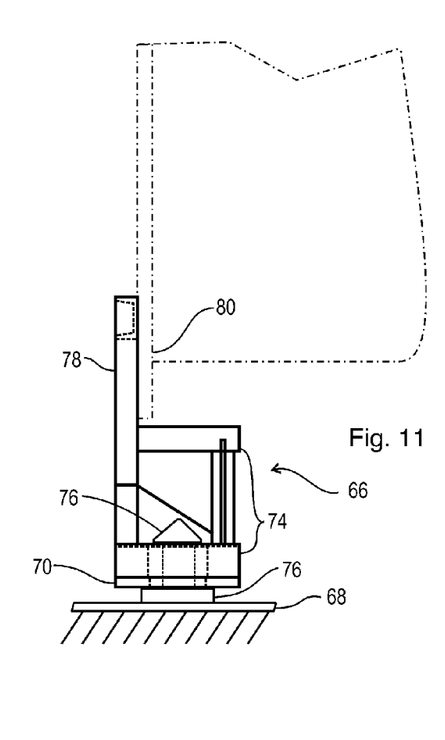
FIG. 11 is a side view drawing of a root end support bracket according to an illustrative embodiment of the present invention.

Reference is directed to FIG. 6 and FIG. 7, which are an elevation view drawing and a plan view drawing, respectively, of a sling car 44 according to an illustrative embodiment of the present invention. An 89 foot flatcar 44 having a steel deck is used as the base platform for a sling car in the system of the present invention. The flatcar 44 consists of a pair of trucks 46, 48 supporting the deck of the rail car 44 in the conventional fashion, and that roll on a conventional railroad line 42. A pair of railcar couplers 50, 52, also of conventional design, bring the overall length of the flatcar 44 to approximately 94 feet. A first sling stand 54 is connected to the deck of the flatcar 44. In the illustrative embodiment, the sling stand 54 is welded to the deck of the flatcar 44. Those skilled in the art will appreciate that other means for connecting the sling stand 54 to the deck of the flatcar 44 could readily be employed, such as twistlock buffers, bolts, rivets and so forth. The sling stand 54 may be fabricated from a variety of light structural steel members, such as square tubing, rectangular tubing, angle iron, channels or light 'I' and 'H' section beam members. In the illustrative embodiment, 4" square tubing is employed with gusset plate stiffeners used to reinforce connections and stiffen the overall structure.

A flexible sling 56 is hung from the sling stand 54, which is utilized to engage and support the airfoil (not shown) along its midsection. The sling 56 principally supports the vertical load forces of the airfoil (not shown) during transit. The sling 56 in the illustrative embodiment is fabricated from high strength nylon or polyester webbing. Those skilled in the art will appreciate that other materials would be suitable as sling material, such as high strength fabrics, conveyor belting, rope, resilient foam blocks and lining sections, chain, and other assemblies providing the requisite flexibility and strength, as are known to those skilled in the art. In the illustrative embodiment, a pair of sets of rollers 58 are supported from the sling stand 54. The rollers 58 are supported on vertical axles such that the rollers may engage the sides of the airfoil (not shown) midsection to prevent excessive lateral movement, while rotatably engaging the airfoil (not shown) with respect to longitudinal movement as the railcars traverse the railroad, etc. The rollers 58 can also be independently supported directly from the sling car 44, or by other suitable means. The rollers 58 assemblies will be more fully discussed hereinafter.

In the illustrative embodiment of FIG. 6 and FIG. 7, a second sling stand 60 is connected to the opposite end of the flatcar 44 than the aforementioned sling stand 54. The second sling stand is added in the situation where three railcars are coupled to transport two airfoils, as discussed hereinbefore. The second sling stand is connected to the flatcar 44 in the same manner as the first sling stand 54. Also, a sling 62 is hung from sling stand 60. Also, a pair of sets of rollers 64 are provided. All of these components are substantially the same as those respecting sling stand 54, and will not be repeated at this time.

Reference is directed to FIG. 8, FIG. 9, FIG. 10, and FIG. 11, which are a bottom view drawing, a top view drawing, an end view drawing, and a side view drawing, respectively, of a root end support bracket 66 according to an illustrative embodiment of the present invention. The base 70 of the bracket 66 is a plate into which two twistlock buffer slots 82, 84 are formed. These slots 82, 84 engage twistlock buffers 76 that are fixed to the deck 68 of the host railroad flatcar by conventional means, as are known to those skilled in the art. Thus, the bracket assembly 66 is set onto the twistlock buffers 76, which are turned to lockably engage the slots 82, 84 in the base plate 70. In the illustrative embodiment, the slots 82, 84 are slightly oversized to provide a slightly flexible connection, which allows the bracket 66 to rotate slightly about a vertical axis during transport of the airfoils 80. The bracket 66 is generally comprised of a box section 74 and a vertical support section 78. The specific design is not critical, however it requires sufficient strength for the load to be carried and have a connection portion 78 to engage the flange 80 of the airfoil 80 that is being transported. In the illustrative embodiment, the root end bracket is fabricated from light steel channel sections and mild steel plate used form connections, reinforcement, and so forth. Plural bolts, nuts, and washers 86 are used to rigidly connect the rood end bracket 66 to the flange of the airfoil 88 at the connection portion 78 of the bracket 66.

Figure 12:
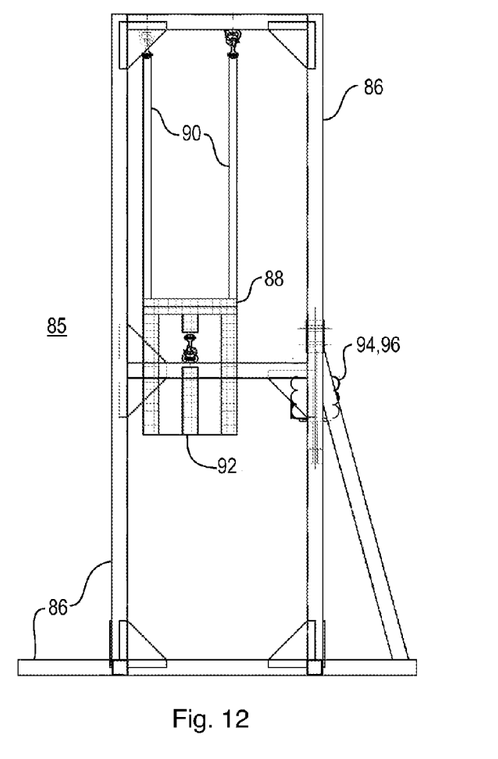
FIG. 12 is a side view drawing of an upper sling support stand according to an illustrative embodiment of the present invention.
Figure 13:
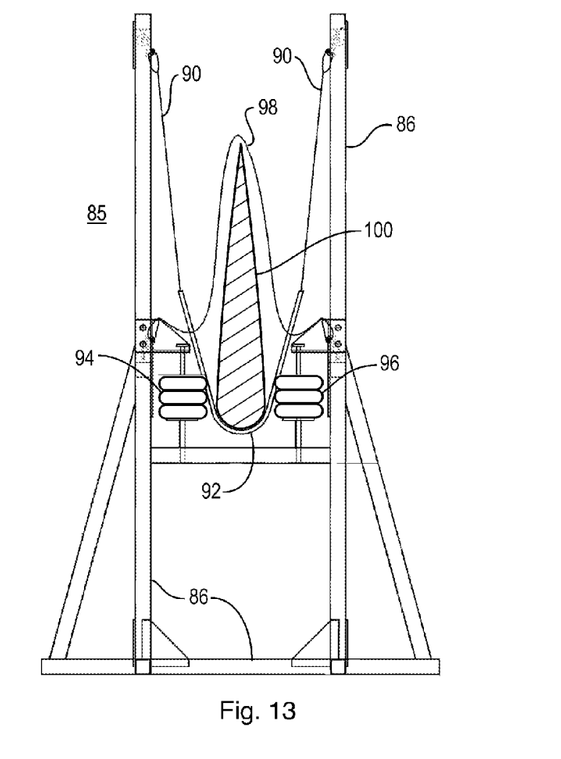
FIG. 13 is an end view drawing of an upper sling support stand according to an illustrative embodiment of the present invention.
Figure 14:
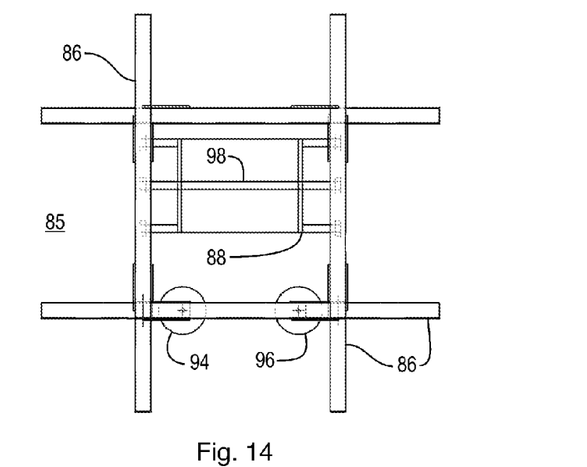
FIG. 14 is a top view drawing of an upper sling support stand according to an illustrative embodiment of the present invention.

Reference is directed to FIG. 12, FIG. 13, and FIG. 14, which are a side view drawing, and end view drawing, and a top view drawing, respectively, of an upper sling support stand according to an illustrative embodiment of the present invention. In the situation where three flatcars are arranged in the order of a first load car, a sling car, and a second load car, which are then used to transport two long airfoils, then the pair of sling stands on the sling car are arranged as an upper sling stand and a lower sling stand so that that tip ends of the two airfoils are supported at different heights to that they cannot interfere with on another. The sling stand 85 in FIGS. 12, 13, and 14 illustrate an upper sling stand. The sling stand 85 consists of a rigid stand 86, which is fabricated from four inch square mild steel structural tubing in the illustrative embodiment. The stand is generally configured as a rectangular box with open ends at the top to provide clearance for loading the airfoil 100 into the stand 86 from above with a suitable crane. Suitable braces and gusset plates are added to reinforce the stand 86 as may be required to resists static and dynamic loads experienced during loading and transport of the blade 100. In the illustrative embodiment, the stand 86 is welded to the deck of a rail flatcar (not shown). Other removable attachment means known to those skilled in the art could be employed as well. A flexible sling 88 is hung from 'D' rings connected to the upper portion of the stand 86. The sling consists of four hanging straps 90 and three support straps 92, which engage the lower portion of the airfoil 100 at a height above the railcar determined by the length of the hanging straps 90. In the illustrative embodiment, heavy duty four inch polyester webbing is used to fabricate the sling 88. Those skilled in the art will appreciate that other suitable materials are available to provide the needed strength and flexibility.

The sling 88 supports the airfoil 100 primarily along the vertical direction, however the sling is flexible to allow some lateral movement and some longitudinal twisting to occur during transport of the airfoil 100. To prevent excessive lateral movement of the airfoil 100, a pair of sets of rollers 94, 96 are positioned along either side of the airfoil 100. Each set of rollers 94, 96 consists of the three pneumatic tires rotatably mounted to a vertical axle that is fixed to the frame 86. The tires engage to the airfoil along its midsection, and rotate as the airfoil 100 moves, thereby preventing excessive lateral movement while protecting the airfoil 100 from any damage. As a means of further protecting and retaining the airfoil 100 in the stand 86, a retention strap 98 is draped over the top of the airfoil 100 and attached to side rails on the frame 86. The retention strap is also fabricated from nylon webbing and attached to 'D' rings connected to the frame 86 side rails.

Figure 15:
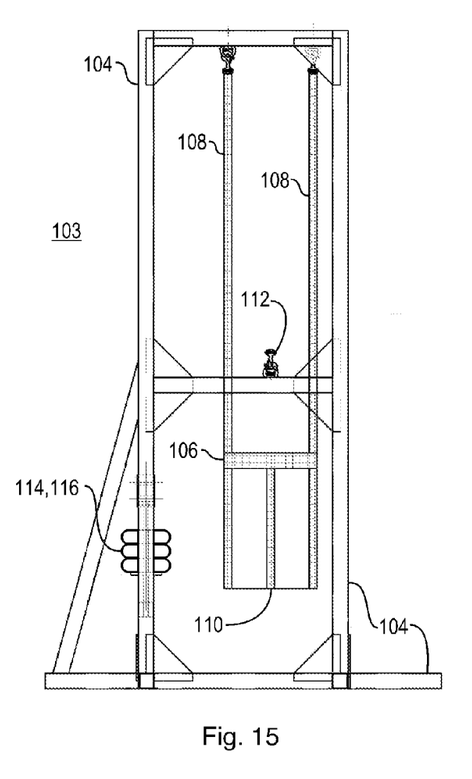
FIG. 15 is a side view drawing of a lower sling support stand according to an illustrative embodiment of the present invention.
Figure 16:
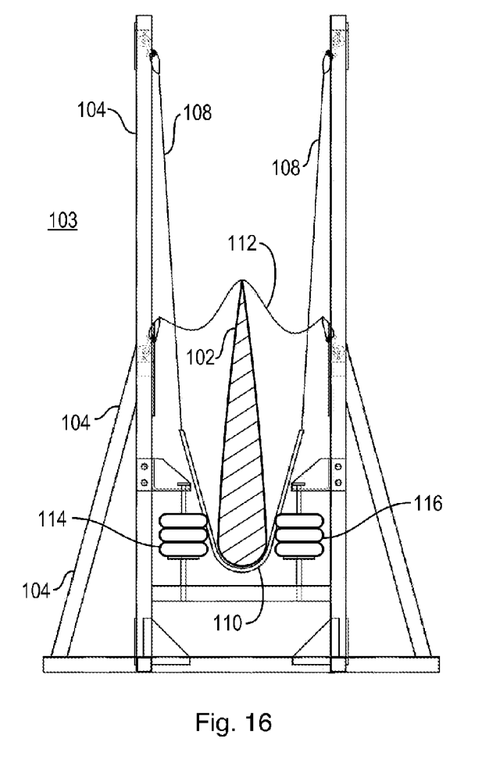
FIG. 16 is an end view drawing of a lower sling support stand according to an illustrative embodiment of the present invention.
Figure 17:
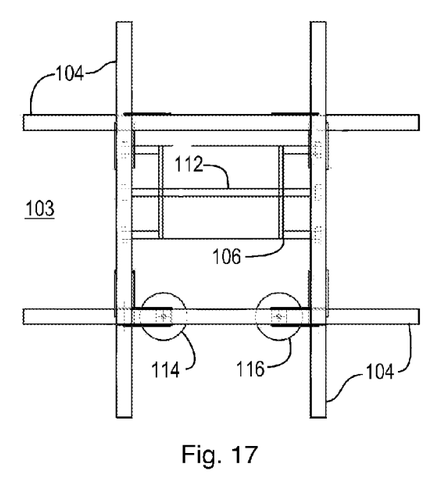
FIG. 17 is a top view drawing of a lower sling support stand according to an illustrative embodiment of the present invention.

Reference is directed to FIG. 15, FIG. 16, and FIG. 17, which are a side view drawing, and end view drawing, and a top view drawing, respectively, of a lower sling support stand according to an illustrative embodiment of the present invention. A sling stand 103 consists of a rigid stand 104, which is fabricated from four inch square mild steel structural tubing in the illustrative embodiment. The stand is generally configured as a rectangular box with open ends at the top to provide clearance for loading the airfoil 102 into the stand 104 from above with a suitable crane. Suitable braces and gusset plates are added to reinforce the stand 104 as may be required to resists static and dynamic loads experienced during loading and transport of the blade 102. In the illustrative embodiment, the stand 104 is welded to the deck of a rail flatcar (not shown). Other removable attachment means known to those skilled in the art could be employed as well. A flexible sling 106 is hung from 'D' rings connected to the upper portion of the stand 104. The sling consists of four hanging straps 108 and three support straps 110, which engage the lower portion of the airfoil 102 at a height above the railcar determined by the length of the hanging straps 108. In the illustrative embodiment, heavy duty four inch polyester webbing is used to fabricate the sling 106. Those skilled in the art will appreciate that other suitable materials are available to provide the needed strength and flexibility.

The sling 106 supports the airfoil 102 primarily along the vertical direction, however the sling 106 is flexible to allow some lateral movement and some longitudinal twisting to occur during transport of the airfoil 102. To prevent excessive lateral movement of the airfoil 102, a pair of sets of rollers 114, 116 are positioned along either side of the airfoil 102. Each set of rollers 114, 116 consists of the three pneumatic tires rotatably mounted to a vertical axle that is fixed to the frame 104. The tires engage to the airfoil along its midsection, and rotate as the airfoil 102 moves, thereby preventing excessive lateral movement while protecting the airfoil 102 from any damage. As a means of further protecting and retaining the airfoil 102 in the stand 104, a retention strap 112 is draped over the top of the airfoil 102 and attached to side rails on the frame 104. The retention strap is also fabricated from nylon webbing and attached to 'D' rings connected to the frame 104 side rails.

Figure 18:
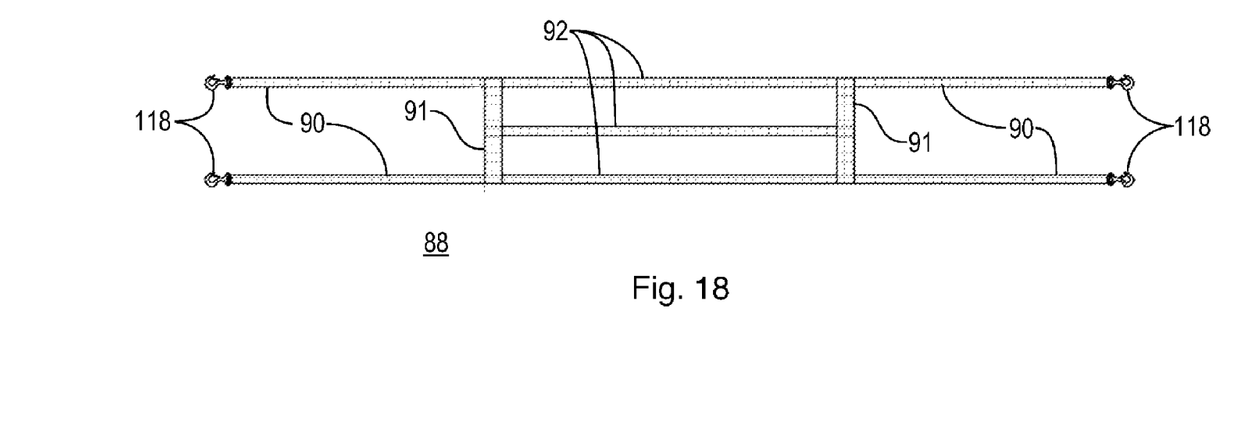
FIG. 18 is a drawing of an upper sling according to an illustrative embodiment of the present invention.

Reference is directed to FIG. 18, which is a drawing of an upper sling 88 according to an illustrative embodiment of the present invention. The sling 88 consists of four hanging straps 90 that are fabricated from four inch polyester webbing, and three support straps 92, also fabricated from four inch polyester webbing. A pair of four inch nylon polyester cross straps 91 join the hanging straps 90 and the support straps 92, as shown. Each of the hanging straps 90 is terminated at its free end with a heavy duty hook 118, which engage corresponding 'D' rings (not shown) that are connected to the sling stand frame (not shown).

Figure 19:
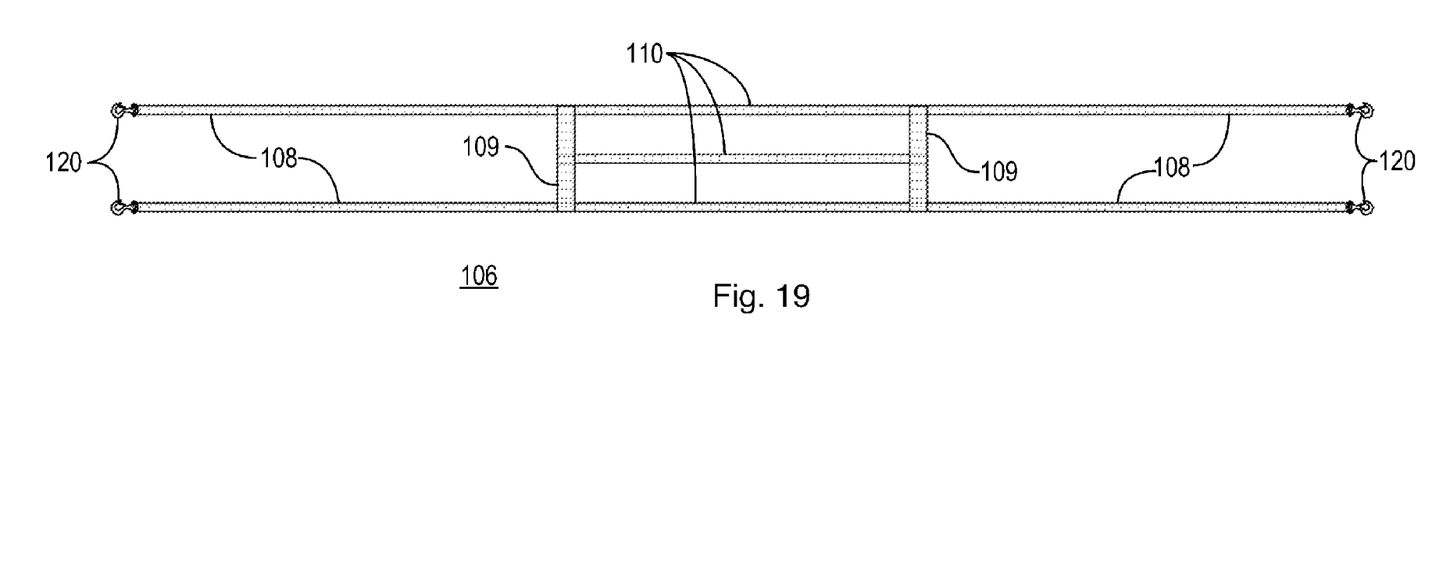
FIG. 19 is a drawing of a lower sling according to an illustrative embodiment of the present invention.

Reference is directed to FIG. 19, which is a drawing of a lower sling 106 according to an illustrative embodiment of the present invention. The sling 106 consists of four hanging straps 108 that are fabricated from four inch polyester webbing, and three support straps 110, also fabricated from four inch polyester webbing. A pair of four inch polyester webbing cross straps 109 join the hanging straps 108 and the support straps 110, as shown. Each of the hanging straps 108 is terminated at its free end with a heavy duty hook 120, which engage corresponding 'D' rings (not shown) that are connected to the sling stand frame (not shown).

Figure 20:
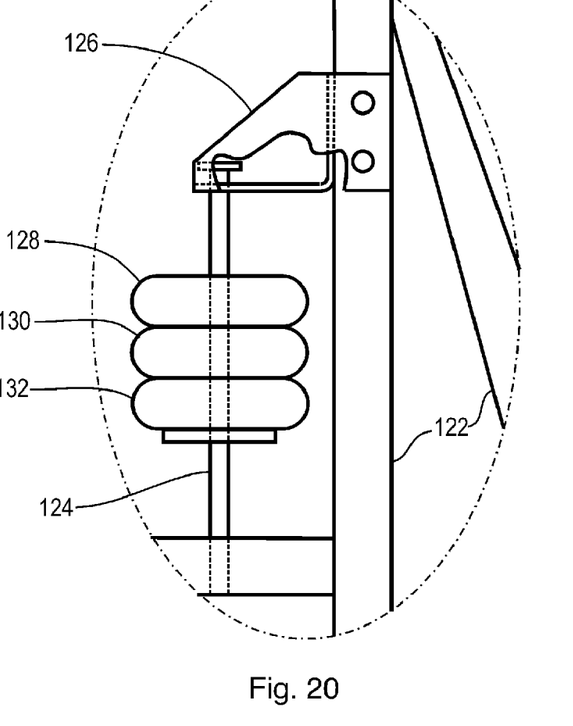
FIG. 20 is a detail drawing of a guide roller according to an illustrative embodiment of the present invention.

Reference is directed to FIG. 20, which is a detail drawing of a guide roller assembly according to an illustrative embodiment of the present invention. Three pneumatic twelve inch tires 128, 130, 132 are supported on a vertical steel axle 124. The axle 124 is connected to the sling stand frame 122 as the lower end and to a suitable mounting bracket 126 at the upper end.

Figure 21:
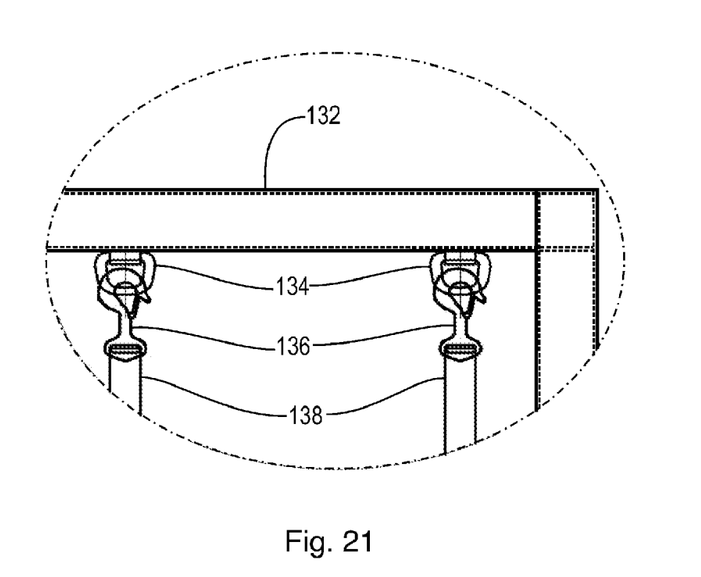
FIG. 21 is a detail drawing of a sling attachment assembly according to an illustrative embodiment of the present invention.

Reference is directed to FIG. 21, which is a detail drawing of a typical sling attachment assembly according to an illustrative embodiment of the present invention. The nylon webbing 138 of the hanging straps are terminated with a heavy duty hook 136. The hook 136 engages a 'D' ring 134 that is fixed to the sling stand frame 132.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A system for transporting an airfoil having a root end, a tip end, and a midsection over a railroad, utilizing a first railcar coupled to a second railcar, the first and second rail cars each having a deck for supporting a load, the system comprising:
   a bracket fixed to the root end of the airfoil and connected to the first railcar, said bracket oriented to support the airfoil above the deck of the first railcar and align the tip end of the airfoil toward the second railcar;
   a sling stand connected to the second railcar, and
   a flexible sling hung from said sling stand and aligned to engage and support the midsection of the airfoil above the deck of the second railcar, and accommodate misalignment between the first railcar and second railcar during transport over the railroad.

2. The system of claim 1, and wherein said first railcar and said second railcars are flat cars.

3. The system of claim 1, further comprising:
   a roller rotatably supported with respect to the second railcar, and aligned to directly engage the midsection of the airfoil and allow longitudinal movement thereof while limiting lateral movement.

4. The system of claim 3, and wherein:
   said roller is supported from said sling stand.

5. The system of claim 3, further comprising:
   a second roller rotatably supported with respect to the second railcar, and aligned to directly engage the opposite side of the midsection of the airfoil from that of said first roller.

6. The system of claim 1, and wherein
   said bracket is removably connected to first railcar.

7. The system of claim 6, and wherein
   said bracket is removably connected with a twist lock coupler.

8. The system of claim 1, and wherein:
   said bracket is flexibly connected to the first railcar, thereby accommodating movement of the airfoil about a vertical axis during transit over the railroad.

9. The system of claim 1, and wherein
   said flexible sling is comprised of plural webbing straps.

10. The system of claim 1, and wherein
    said flexible sling is removably attached to said sling stand with plural rings and hooks.

11. The system of claim 1, and wherein:
    said bracket is bolted to a flange on root end of the airfoil.

12. The system of claim 1, further comprising:
a retention strap attached to said sling stand and draped over the top of the airfoil for limiting upward movement thereof.

13. The system of claim 1, and wherein the midsection of the airfoil is designated as a suitable support section of the airfoil.

14. The system of claim 1 for additionally transporting a second airfoil, similar to the first airfoil, by utilizing a third railcar, having a deck for supporting a load, coupled to the opposite end of the second railcar from that coupled to the first railcar, the system further comprising:
a second bracket fixed to the root end of the second airfoil and connected to the third railcar, said second bracket oriented to support the airfoil above the deck of the third railcar and align the tip end of the second airfoil toward the second railcar;
a second sling stand connected to the second railcar;
a second flexible sling hung from said second sling stand and aligned to engage and support the midsection of the second airfoil above the deck of the second railcar, and accommodate misalignment between the third railcar and second railcar during transport over the railroad.

15. The system of claim 14, and wherein:
said second sling stand and said second flexible sling support the tip of the second airfoil above the tip of the airfoil, thereby preventing interference therebetween.

16. A method for transporting an airfoil having a root end, a tip end, and a midsection over a railroad, utilizing a first railcar and a second rail car, the first and second rail cars each having a deck for supporting a load, the method comprising the steps of:
connecting a sling stand to the second railcar;
hanging a flexible sling from the sling stand;
coupling the first railcar to the second railcar;
fixing a bracket to the root end of the airfoil;
connecting the bracket to the first railcar, and orienting the bracket to support the airfoil above the deck of the first railcar and align the tip end of the airfoil toward the second rail car;
supporting the midsection of the airfoil with the sling above the deck of the first railcar, and
accommodating misalignment between the first railcar and second railcar during transport over the railroad by flexing the sling.

17. The method of claim 16, further comprising the step of:
allowing longitudinal movement of the airfoil, while limiting lateral movement, by positioning a roller adjacent to the midsection thereof.

18. The method of claim 16, further comprising the step of:
removably connecting the bracket to the first railcar.

19. The method of claim 16, further comprising the step of:
flexibly connecting the bracket to the first railcar, thereby accommodating movement of the airfoil about a vertical axis during transit over the railroad.

20. The method of claim 16, further comprising the step of:
limiting upward movement of the airfoil by draping a retention strap over the top of the airfoil and connecting the retention strap to the sling stand.

* * * * *